(12) United States Patent
Skinner et al.

(10) Patent No.: US 12,675,250 B2
(45) Date of Patent: Jul. 7, 2026

(54) DISPLAY DEVICE CONTROL

(71) Applicant: LENOVO (SINGAPORE) PTE. LTD, Singapore (SG)

(72) Inventors: Jeffrey E. Skinner, Morrisville, NC (US); Ali Ent, Morrisville, NC (US); Ghwang Hyun Lim, Morrisville, NC (US); Alden Rose, Morrisville, NC (US); Jung Hwan Hong, Morrisville, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 282 days.

(21) Appl. No.: 17/849,618

(22) Filed: Jun. 25, 2022

(65) Prior Publication Data

US 2023/0418540 A1      Dec. 28, 2023

(51) Int. Cl.
*G06F 3/14* (2006.01)
*G06F 3/0482* (2013.01)
*G06F 21/60* (2013.01)

(52) U.S. Cl.
CPC .......... *G06F 3/1446* (2013.01); *G06F 3/0482* (2013.01); *G06F 3/1454* (2013.01); *G06F 21/606* (2013.01); *G06F 2203/04803* (2013.01)

(58) Field of Classification Search
CPC ..... G09G 5/005; G06F 3/1446; G06F 3/0482; G06F 3/1454; G06F 21/606; G06F 2203/04803
See application file for complete search history.

(56) References Cited

U.S. PATENT DOCUMENTS

| | | | |
|---|---|---|---|
| 11,079,995 B1* | 8/2021 | Hulbert | G06F 3/0485 |
| 11,159,932 B1* | 10/2021 | Meyer | G06F 3/016 |
| 2015/0039998 A1* | 2/2015 | Lieb | G09G 5/005 |
| | | | 715/234 |
| 2015/0077311 A1* | 3/2015 | Nishimura | H04N 9/3147 |
| | | | 345/1.3 |
| 2016/0260408 A1* | 9/2016 | Chen | G09G 5/005 |
| 2016/0316259 A1* | 10/2016 | Kambhatla | H04N 21/44227 |
| 2019/0384481 A1* | 12/2019 | Bender | G06F 3/1423 |
| 2020/0106877 A1* | 4/2020 | Ledvina | H04W 12/06 |

OTHER PUBLICATIONS

Microsoft Corp., Display Devices Reference, Jun. 1, 2022 (https://docs.microsoft.com/en-us/windows/win32/api/_display/) (1321 pages).
Dotlic et al., Angle of Arrival Estimation Using Decawave DW1000 Integrated Circuits, IEEE Xplore: Jan. 11, 2018, IEEE 2017 14th Workshop on Positioning, Navigation and Communications (WPNC), Date of Conference: Oct. 25-26, 2017 (6 pages).

* cited by examiner

*Primary Examiner* — Cesar B Paula
*Assistant Examiner* — David Tan
(74) *Attorney, Agent, or Firm* — Brian J. Pangrle

(57)      ABSTRACT
A method can include detecting presence of a first display device adjacent to a second display device, where the first display device includes a first display and the second display device includes a second display; responsive to the detecting, automatically rendering a graphical user interface to one or more of the first display and the second display; and responsive to receipt of input via the graphical user interface, transmitting content from the second display device to the first display device for rendering to the first display according to the input.

19 Claims, 10 Drawing Sheets

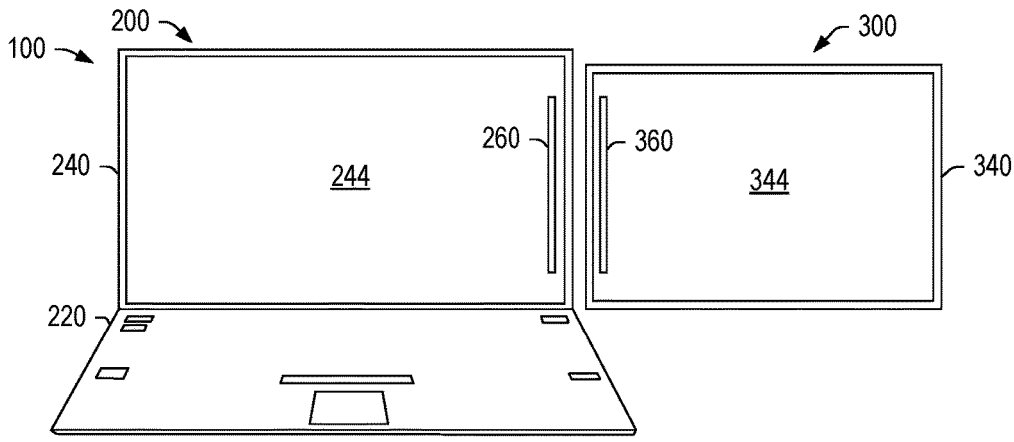
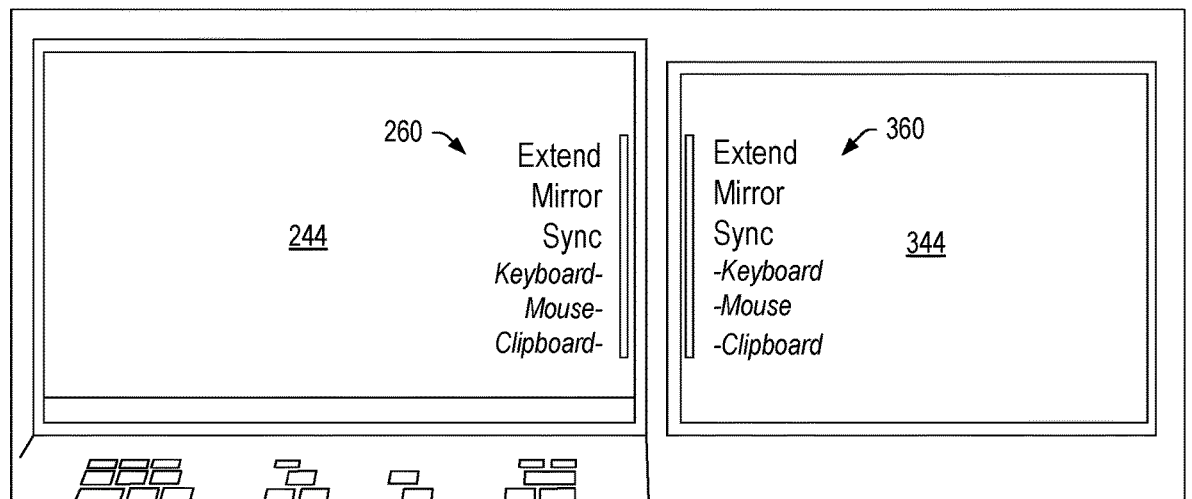
FIG. 4

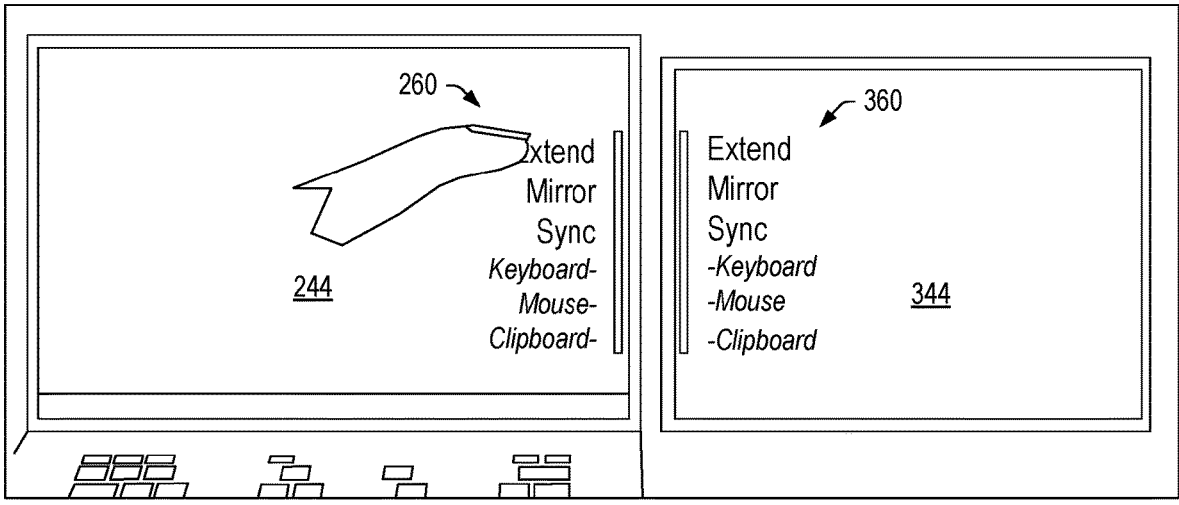
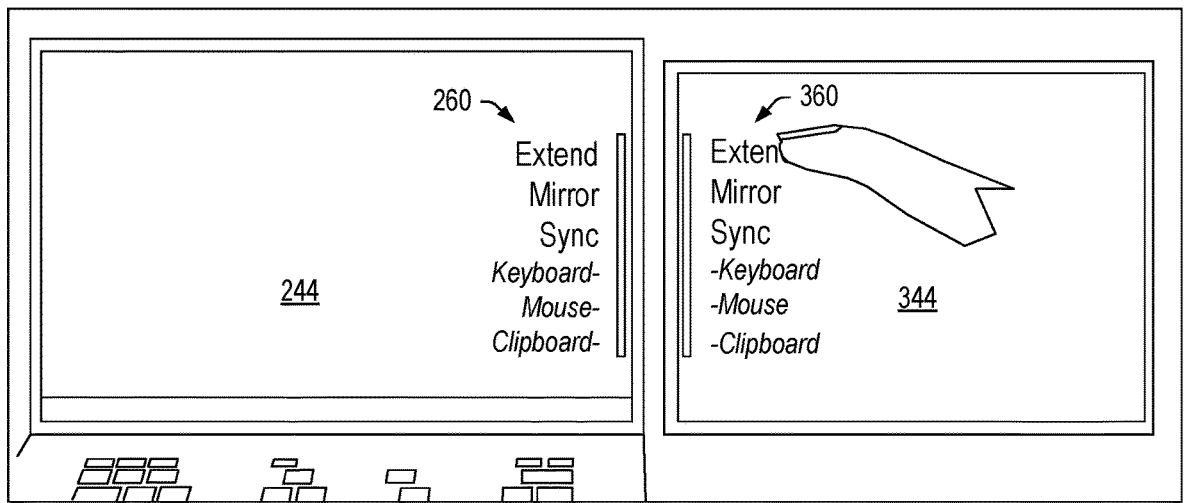
FIG. 5

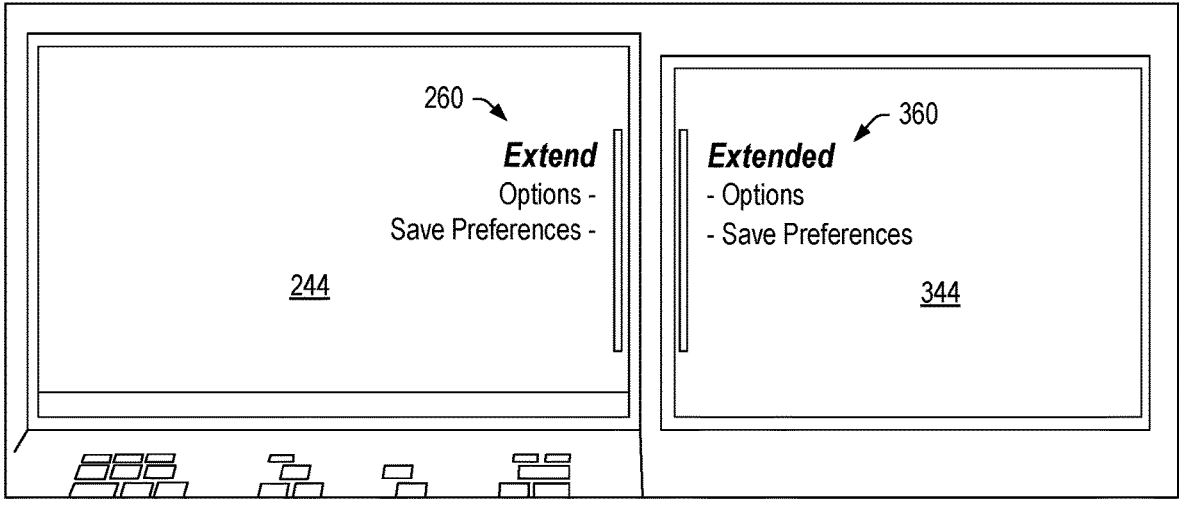
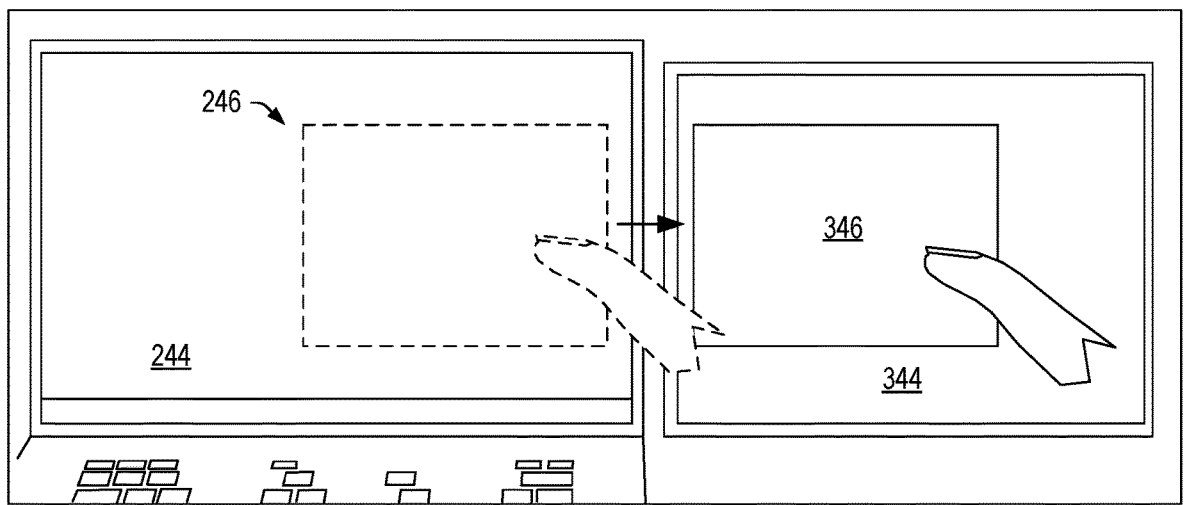
FIG. 6

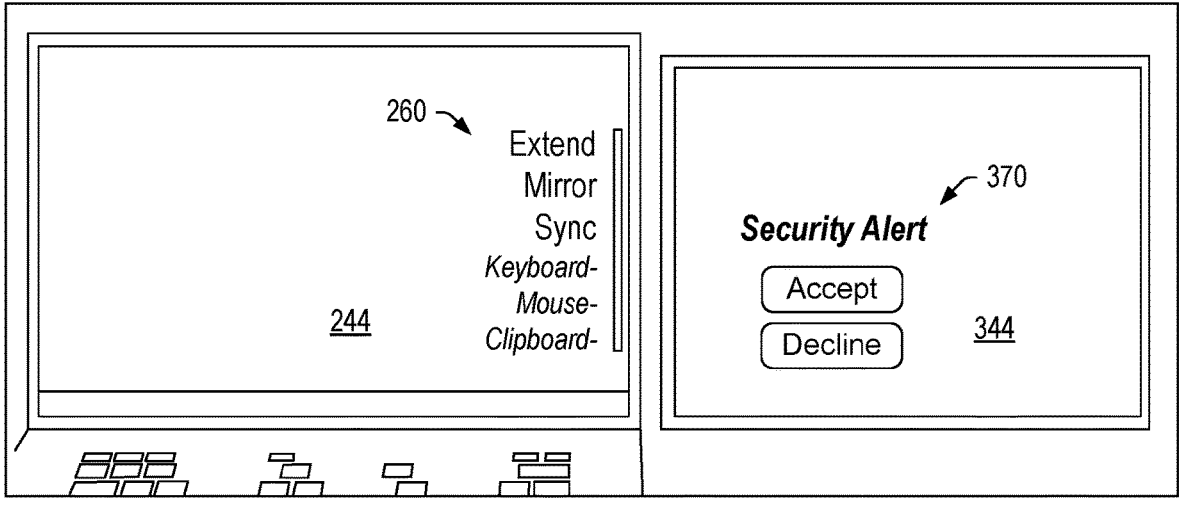
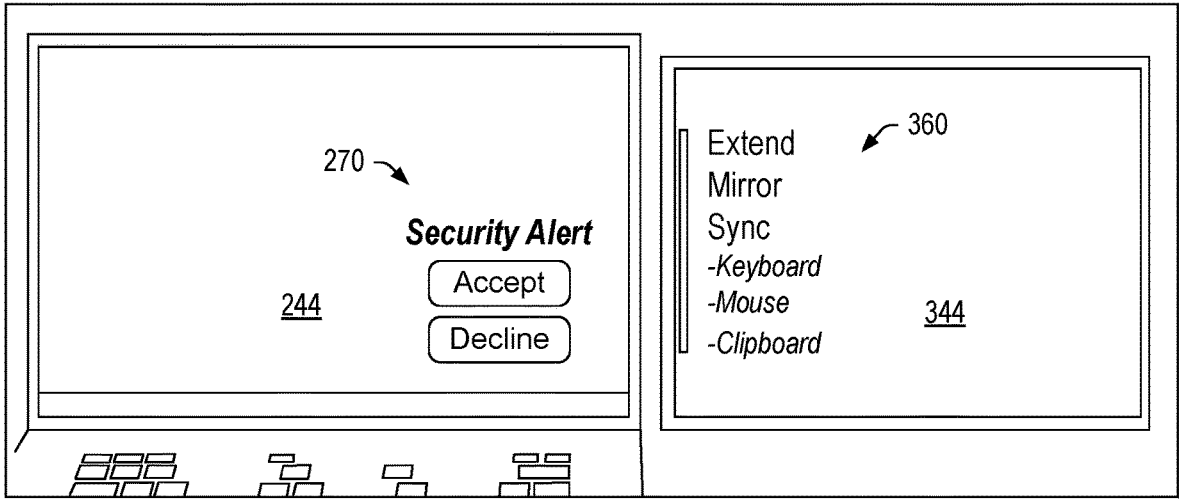
FIG. 7

RGB-1 ≠ RGB-2
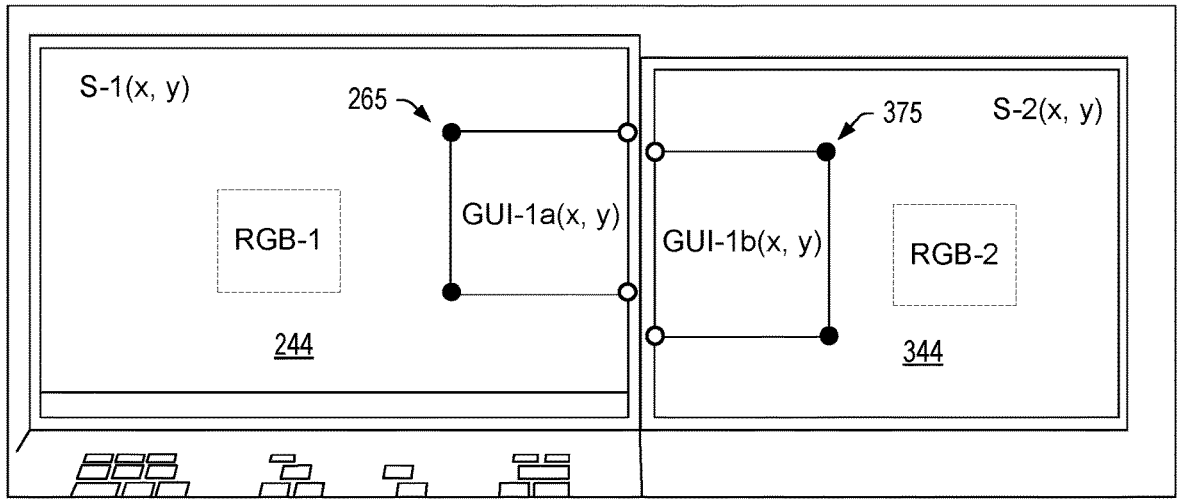
RGB-1 = RGB-2
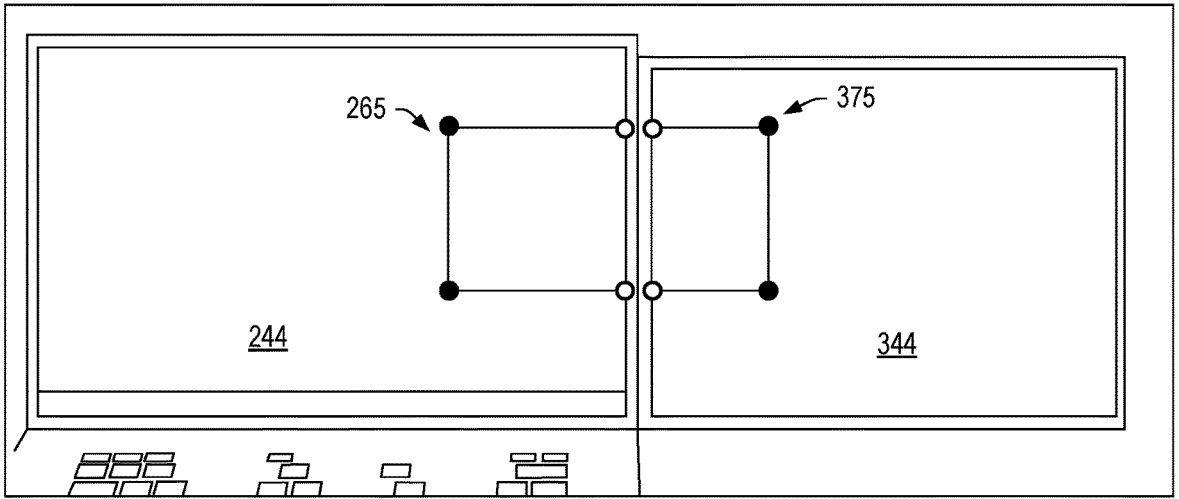
FIG. 8

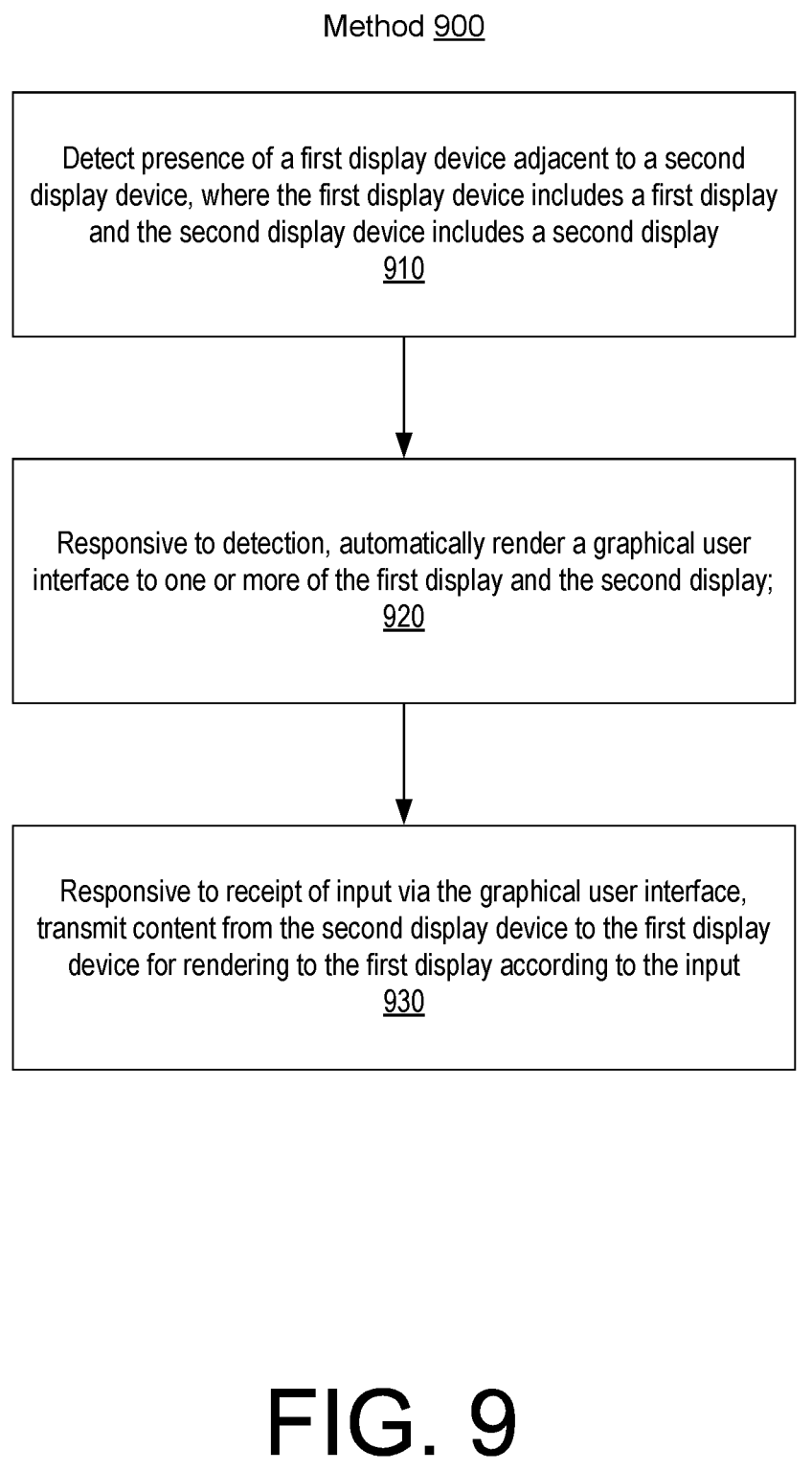

Method 900

Detect presence of a first display device adjacent to a second display device, where the first display device includes a first display and the second display device includes a second display
910

Responsive to detection, automatically render a graphical user interface to one or more of the first display and the second display;
920

Responsive to receipt of input via the graphical user interface, transmit content from the second display device to the first display device for rendering to the first display according to the input
930

FIG. 9

DISPLAY DEVICE CONTROL

TECHNICAL FIELD

Subject matter disclosed herein generally relates to technology for display devices.

BACKGROUND

Various displays devices can be clamshell device, which may be referred to as notebook devices, tablet devices, which may be referred to as slate devices, or monitor devices that may or may not include one or more processors and associated memory. In various instances, a user may want to use more than one display device, for example, to have a larger viewable display area for rendering of content.

SUMMARY

A method can include detecting presence of a first display device adjacent to a second display device, where the first display device includes a first display and the second display device includes a second display; responsive to the detecting, automatically rendering a graphical user interface to one or more of the first display and the second display; and responsive to receipt of input via the graphical user interface, transmitting content from the second display device to the first display device for rendering to the first display according to the input. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 4 is a diagram of an example of a system that includes examples of display devices;

FIG. 5 is a diagram of an example of a system that includes examples of display devices;

FIG. 6 is a diagram of an example of a system that includes examples of display devices;

FIG. 7 is a diagram of an example of a system that includes examples of display devices;

FIG. 8 is a diagram of an example of a system that includes examples of display devices;

FIG. 9 is a block diagram of an example of a method; and

DETAILED DESCRIPTION

Figure 1:
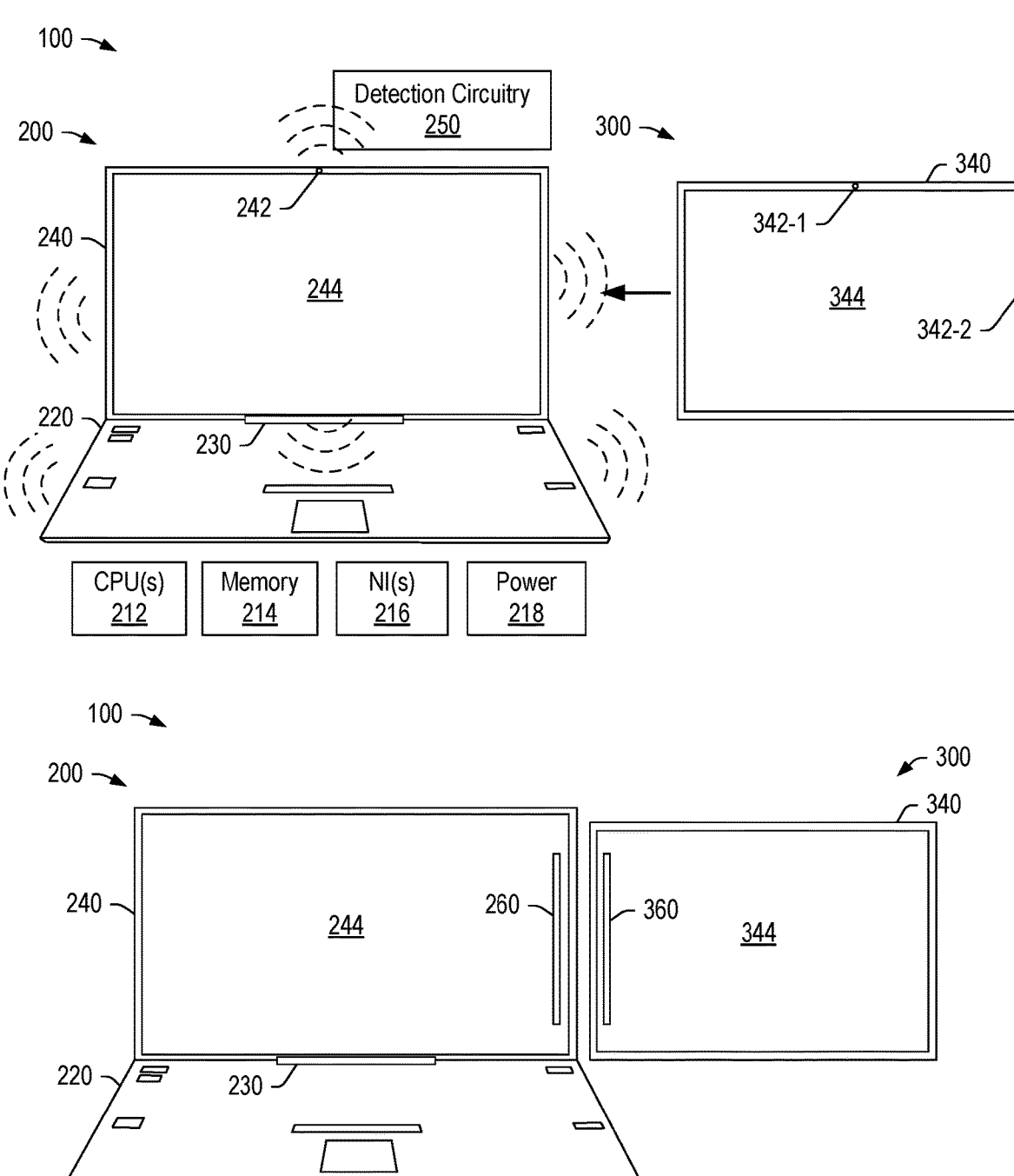
FIG. 1 is a diagram of an example of a system that includes examples of display devices.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As explained, various types of display devices exist, which can include clamshell devices, tablet devices and monitor devices. At times, a user or users may want to utilize more than one display device. In various instances, a user or users may want to transmit and/or receive digital information (e.g., digital content, etc.) by a display device or by display devices. As an example, a method can ease interaction of multiple display devices. Such a method may be suitable for use with two or more display devices.

As explained, a user or users may want to share content, inputs and screens. For example, a user may desire extending a display of a WINDOWS operating system clamshell device through use of a display of the user's WINDOWS operating system tablet device. Or, for example, a user may desire extending a display of a WINDOWS operating system clamshell device through use of a display of the user's ANDROID operating system tablet device. As an example, a method can provide for homogeneous and/or heterogeneous operating system interaction. For example, executable instructions may utilize one or more sets of features associated with one or more operating systems, optionally with a converter where heterogeneous operating systems are involved. As to examples of sets of features, consider, for example, application programming interface (API) features as associated with operating systems such as WINDOWS, ANDROID, CROME, IOS, UNIX, etc.

Various members of the WINDOWS family of operating systems include APIs for various display related matters. For example, to get information about a display device, the EnumDisplaySettings function and/or the EnumDisplaySettingsEx function may be utilized. Another function is the ChangeDisplaySettingsEx function, which can be used to control one or more display devices of a computing device. For example, it can be utilized to modify the configuration of a device, such as specifying the position of a monitor on a virtual desktop and changing a bit depth of a display or displays. As an example, to add a display monitor to a multiple-monitor system programmatically, a method can include setting DEVMODE.dmFields to DM_POSITION and specifying a position (e.g., using DEVMODE.dmPosition) for the display monitor that is being adding that is considered to be adjacent to at least one pixel of a display area of an existing display monitor. As an example, to detach a display monitor, a method can provide for setting DEVMODE.dmFields to DM_POSITION and setting DEVMODE.dmPelsWidth and DEVMODE.dmPelsHeight to zero.

For each display device, a program (e.g., an application or app) can save information in the registry that describes configuration parameters for the display device, as well as location parameters. In such an example, the program may also determine which display device or display devices are part of a desktop, and which are not, through the DISPLAY_DEVICE_ATTACHED_TO_DESKTOP flag in the DISPLAY_DEVICE structure. Once configuration information is stored in the registry, the program can call ChangeDisplaySettingsEx again to dynamically change the settings, with no restart required.

As an example, a method can include looping display dimensions using the function EnumDisplayMonitors (NULL, NULL, MyInfoEnumProc, 0), which is available as part of the Win32 API. For example, a program can pack an enumeration code in a structure that can be looped to retrieve information related to each display device.

As to the function EnumDisplayMonitors, a rectangle of a desktop window returned by GetWindowRect or GetClientRect is equal to the rectangle of the primary display device, for compatibility with existing applications. As an example, a method can change the work area of a display device by calling the function SystemParametersInfo with SPI_SETWORKAREA and pvParam pointing to a RECT structure that is on the desired display device. In such an example, if pvParam is NULL, the work area of the primary display device is modified. As an example, a method can include using the function SPI_GETWORKAREA, which returns the work area of the primary display device and/or using the function GetMonitorInfo to get the work area of a display device other than the primary display device.

As an example, a method can include acquiring information about settings such as color settings, intensity settings, contrast settings, etc. As an example, in a WINDOWS API, a handle to a device context ca use unnamedParam2. The device context includes color attributes that are appropriate for a display device identified by hMonitor. The clipping area of the device context can be set to the intersection of a visible region of the device context identified by the hdc parameter of EnumDisplayMonitors, the rectangle pointed to by the IprcClip parameter of EnumDisplayMonitors, and the display device rectangle. In such an example, this value may be NULL if the hdc parameter of EnumDisplayMonitors is NULL.

As an example, a method may include determining whether relevant multiple display devices in a system share the same color format, for example, by calling GetSystemMetrics (SM_SAMEDISPLAYFORMAT). In various instances, a method may not have to use the EnumDisplayMonitors function when a window (e.g., a GUI) spans display devices that have different color formats. For example, a method can provide for continued painting under the assumption that the entire screen has the color properties of the primary display device. In various instances, windows (e.g., GUIs, etc.) will look fine to a user or users; however, a method may utilize the function EnumDisplayMonitors to tune rendering, for example, by harmonizing or otherwise adjusting settings to make a window or windows renderable to multiple display devices look better.

A particular parameter is SM_SAMEDISPLAYFORMAT, which is nonzero if all the display devices have the same color format, otherwise, it is 0. As an example, two display devices can have the same bit depth, but different color formats. For example, the red, green, and blue (RGB) pixels can be encoded with different numbers of bits, or those bits can be located in different places in a pixel color value.

As an example, a method may utilize a function MONITORINFOF_PRIMARY, which is set forth, in part, as follows in the WINDOWS system:

```
namespace System.Windows.Forms {
  using System.Threading;
  using System.Runtime.InteropServices;
  using System.Diagnostics;
  using System;
  using System.Drawing;
  using System.Windows.Forms;
  using System.Collections;
  using Microsoft.Win32;
  using Internal;
  /// <include file='doc\Screen.uex' path='docs/doc[@for="Screen"]/*' />
  /// <devdoc>
  ///   <para>
  ///     Represents a display device or
  ///     multiple display devices on a single system.
  ///   </para>
  /// </devdoc>
```

4

As indicated, MONITORINFOF_PRIMARY "represents a display device or multiple display devices on a single system". Various parameters or data structures may be utilized such as, for example, rcMonitor, which is a RECT structure that specifies the display device rectangle, expressed in virtual-screen coordinates. Note that if the display device is not the primary display device, some of the rectangle's coordinates may be negative values. As another example, consider rcWork, which is a RECT structure that specifies the work area rectangle of a display device, expressed in virtual-screen coordinates. Note, that as with rcMonitor, if the display device is not the primary display device, some of the rectangle's coordinates may be negative values.

As an example, a method can include determining that a multi-display setup has been established where the method can obtain more information about a secondary display device by using the function Window.getScreenDetails( ). Calling this function will trigger rendering of a permission prompt that asks whether permission exists or can be obtained to open and place windows on a display device. The aforementioned function returns a promise that resolves with a ScreenDetailed object. For the IOS, consider an example of a MACBOOK PRO 13 notebook device with a connected IPAD tablet device, with a screens field with two ScreenDetailed objects.

In the CHROME system, a multi-screen window placement API is available. For some apps, opening new windows and putting them in specific places, or specific displays can be desirable. For example, consider a slideshow where slides are to appear full screen on a primary display device and notes are to appear on a secondary display device. The multi-screen window placement API allows for enumerating one or more display devices connected to a computing device and placing windows (e.g., GUIs) on specific displays. As an example, a method can include checking if there is more than one display device connected to a device with window.screen.isExtended, which can return a true or false value. Various features are available via window.getScreenDetails( ), which provides details about one or more displays.

As an example, various techniques may be implemented to make determinations as to cloning and extending. Cloning may be referred to as mirroring and may appear in a method as "clone"; while extending may appear I a method as "extend". For example, in WINDOWS systems, SDC_TOPOLOGY_XXX flags can be used in combinations. For example, if SDC_TOPOLOGY_CLONE and SDC_TOPOLOGY_EXTEND are set, the WINDOWS API uses the most recent clone or extend topology, which every topology was set with most recently for the current connected display devices. A document entitled "Display Devices Reference", dated Jun. 1, 2022, of Microsoft Corporation is incorporated by reference herein in its entirety, which includes Win32 API specifications.

As explained, various APIs are available for various operating systems that can acquire information about displays of display devices and that can set one or more settings of the display devices. However, use of such APIs depends on a user setting up display devices, for example, by connecting them with one or more cables, accessing one or more wireless features manually (e.g., WIDI, MIRACAST, etc.), etc. As an example, a method can provide a streamlined non-contact, proximity-based approach that eases use of multiple display devices.

As an example, a method can ease user burden when a user wants to use an ANDROID OS table device as an additional display for a WINDOWS clamshell device. Without such a method, the user may have to navigate one or more user interfaces to find the appropriate program or programs and then manually adjust display settings such that content is oriented correctly by both OSs. Additionally, for these two (or more) devices to talk to one another there may be a demand for authentication by the same user. Further, getting files from one device to another can also be laborious. For example, a user may resort to emailing photos and files to themselves because her devices do not afford a pathway for easier file exchange. Similarly, there may not be an easy way for the sharing of human input device inputs such as from a keyboard and a mouse from a laptop to one or more other devices such as an ANDROID tablet device or another WINDOWS device.

As an example, a method may interact with an existing program such as, for example, the Sidecar program, which allows use of an IPAD tablet device as an external display device for a IOS clamshell device via the wireless AIRPLAY technology. Another program is Universal Control, noting that Sidecar does not allow for access a wirelessly connected IPAD at all (i.e., files or apps cannot be used).

As an example, a method can streamlines device interaction via device connections by surfacing a momentary GUI when devices are near one another, making it easy and quick to share content, screens and inputs. In addition to reducing friction, such an approach can provide a user or users added flexibility in how devices are used.

As an example, a method may implement one or more technologies, which can include one or more of BLUETOOTH, ultra-wideband (UWB), NFC, WIDI, MIRACAST, or another wireless protocol. As an example, a method may utilize hardware connection pins with or without wireless technology. As an example, a method may utilize one or more technologies to determine a display device's location relative to another display device. As an example, one proximity is determined, one or more connections may be established and/or rendering and/or control features triggered.

As an example, a method can include rendering one or more GUIs, which can include a proximity position GUI. For example, a GUI may be rendered to a display of one display device and a GUI may be rendered to a display of another display device where the two GUIs are readily accessible by one or more fingers of the same hand of an individual as the two GUIs may be rendered adjacent to proximate sides of the two displays of the two display devices. Where both displays are touch screen displays, a user can utilized a single hand to readily contact either or both GUIs. For example, consider a user that uses an index finger of the right hand for GUI input on a left display and a middle finger of the right hand for GUI input on a right display. As an example, a user may contact each of the two GUIs simultaneously or within a small window of time (e.g., less than a few seconds). In such an approach, input or inputs may be utilized to provide desired settings for each of the two displays of the two display devices, which may include provisions for rendering, human input device input, file sharing, application sharing, etc.

As explained, a proximity based approach may be utilized. As an example, one or more sensors and/or one or more wireless protocols may provide for proximity sensing. As an example, the UWB technology can provide for angle of arrival and distance information, where distances as short as 10 cm may be determined and angles of plus or minus a few degrees may be determined. In such an approach, a display device or display devices may assess distance and angle to determine what edges of their displays are closest to one another for purposes of rendering one or more GUIs. As an example, one or more devices can be defined with respect to one or more coordinate systems (e.g., Cartesian, cylindrical, spherical, etc.) where a relationship between devices can be defined, which may include defining one or more distances, one or more vectors, one or more angles, one or more velocities, one or more accelerations, etc.

As to angle of arrival (AOA) techniques, using impulse radio UWB (IR-UWB), one or more of various schemes can be used to calculate AOA from an IR-UWB source (tag) transmitting to two IR-UWB receivers (anchor). For example, consider a TOF scheme where a delta between two measured TOF values is used to estimate an angle. TOFs may be estimated by two separate two-way ranging procedures. As another example, consider a time difference of arrival (TDOA) scheme where a delta between received timestamps of the same frame is used to estimate an angle. Yet another example can be phase difference of arrival (PDOA) where a delta between phases of the received carrier is used to estimate an angle for the same frame. Further, consider a TDOA/PDOA hybrid scheme where, for distances between antennae above half-wavelength, TDOA is used to select one of pre-defined AOA intervals and PDOA is used to get the AOA estimate within the selected interval. Of such schemes, PDOA provides relatively high accuracy of an angle estimate; noting that a hybrid or hybrids may be utilized.

As to the PDOA scheme, consider a radio signal sent from a distant transmitter of device A (e.g., transmitter antenna) which arrives at two antennas of device B where a difference in path length is related to the distance between the two antennas of device B and the AOA with respect to the radio signal transmitted by device A. In such an example, UWB receivers of device B (e.g., an antenna array) are capable of path separation due to the large bandwidth of the UWB pulse (its short duration). Hence PDOA of a first path can be precisely measured by using a coherent UWB radio. An article by Dotlic et al., Angle of Arrival Estimation Using Decawave DW1000 Integrated Circuits, IEEE Xplore: 11 Jan. 2018, IEEE 2017 14th Workshop on Positioning, Navigation and Communications (WPNC), Date of Conference: 25-26 Oct. 2017, is incorporated herein by reference.

As an example, an approach can be dynamic and allow for automatic GUI rendering and/or desired use given predetermined settings, which may be history based (e.g., histories stored in memory of one or more display devices). While UWB is mentioned, an approach may utilize one or more magnets and one or more magnetic field sensors (e.g., Hall effect sensors, etc.). As an example, a Hall effect sensor can output a signal that is related to magnetic field strength such that proximity can be determined. As an example, an array of sensors may provide for position as well as proximity. As an example, one or more optical sensors may be utilized (e.g., consider a range finder), one or more contact sensors may be utilized (e.g., consider a touch sensitive surface), etc. As an example, proximity may be specified using a distance or a range, which may depend on type of sensor or sensors utilized (e.g., detection circuitry, etc.). For example, UWB may utilize approximately 10 cm as being proximate while a contact sensor may utilize approximately 0 cm as being proximate (e.g., in contact, touching, etc.). As an example, one or more proximity criteria may specify a distance or distances, an angle or angles, etc. For example, consider a range from 0 to 10 cm for a distance proximity criterion. In such an example, as to the 10 cm distance proximity criterion, if a user brings a display device within 10 cm or closer of another display device that may be interpreted as intent to operatively couple the display devices. As to 0 cm, contact can infer a user's intent to operatively couple the display devices. While a single user is mentioned, as an example, two users may bring their respective display devices into proximity of one another with intent to operatively couple their display devices.

While various examples mention display devices, an approach may provide for suitable use where only one device includes a display. For example, consider a method that assesses various factors such as device type (e.g., presence of a display, presence of a keyboard, etc.) and/or security level (e.g., user authorization, authorization by multiple users, etc.). As an example, a user may be working on a clamshell display device and have two documents open at once, maximized to full screen. In such an example, the user may grab another individual's table device where that individual may not be present and may not have shared her password. In such an example, a method can assess various factors and decide that use of the display of the tablet device is permissible without allowing for use of other features (e.g., files, apps, etc.). In such an example, the user can then use the display of the tablet device as an extra display.

As explained, connection options may be limited while still being able to temporarily receive a video signal. In various instances, sensitive data exchange can be permitted or prohibited. In various instances, devices may be one-way as a screen extension optionally with other features or devices may be two-way.

As explained, a method can include a one-way or a two-way (or more than two-way) exchange of screen specifications, which may provide for screen-to-screen connections that allow devices to optimize one or more of UIs and formats of content, for example, to ensure consistent scale, color and brightness of extended content and/or mirrored content.

As an example, a method can include providing connection options in a GUI or GUIs where the method can include providing visual confirmation of devices positional setup, allowing for natural mousing or dragging of content without having to adjust system settings.

FIG. 1 shows an example of a system 100 that includes a first display device 200 with a base housing 220, a hinge assembly 230 and a display housing 240 with a display 244 and a second display device 300 with a housing 340 with a display 344. As shown, the display device 300 can be positioned proximate to the display device 200 such that one or more GUIs 260 and 360 can be rendered to the displays 244 and 344. As an example, the display device 200 may include one or more processors 212, memory 214 (e.g., one or more memory devices), one or more network interfaces 216, and one or more power cells 218. Such components may be, for example, housed within the keyboard housing 220, the display housing 240, or the keyboard housing 220 and the display housing 240. As an example, the display device 300 can include one or more features of the display device 200. As shown, the display device 200 can include one or more cameras 242 and the display device 300 can include one or more cameras 342-1 and 342-2.

In the example of FIG. 1, the first display device 200 can include detection circuitry 250, which can include one or more types of sensors, which can be or can include one or more proximity sensors. As an example, a sensor may be a Hall effect sensor, an antenna, an optical sensor, a contact sensor, etc. As shown, the detection circuitry 250 may provide for directional detection, for example, with respect to edges of the display housing 244. As an example, one or more types of detection circuitry may provide for distance and angle of arrival, which may be interpreted to determine how a display device is positioned with respect to another display device. As an example, the detection circuitry 250 may provide positional information, which may be utilized to determine how and/or where to render one or more graphical user interfaces (GUIs).

Figure 2:
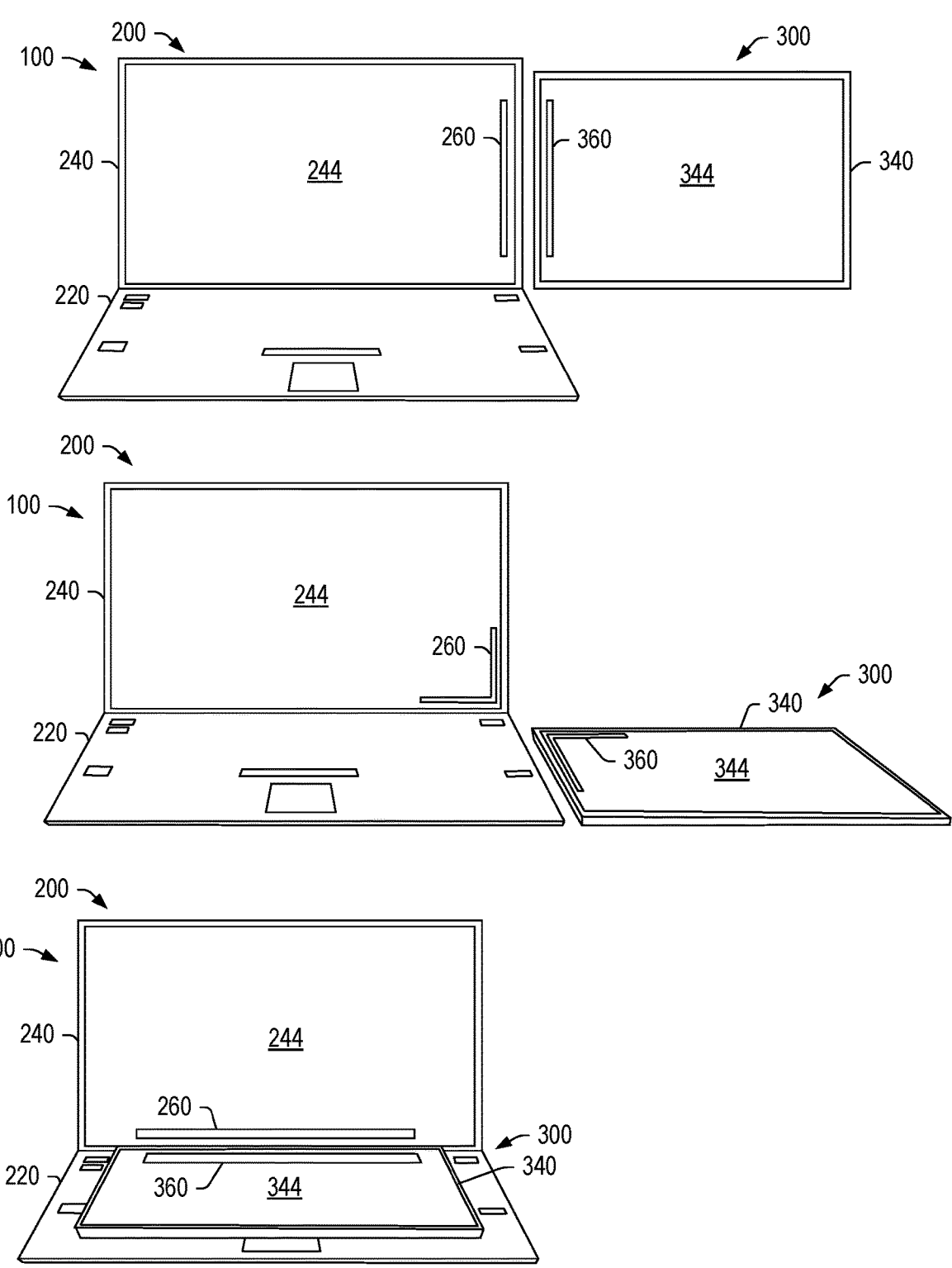
FIG. 2 is a diagram of an example of a system that includes examples of display devices.

FIG. 2 shows examples of the system 100 where the one or more GUIs 260 and 360 can be rendered based on positional proximity. For example, consider side edge rendering, corner rendering and bottom-top rendering. In each of the examples of FIG. 2, positional information can be utilized, for example, to determine how a display is to be extended and/or to determine a relationship for interaction between devices 200 and 300, which may be related to input, application specifics (e.g., tools, notes, etc.), etc. For example, in the middle example and/or the bottom example of FIG. 2, the device 300 may be utilized as a digitizer tablet, a touchpad, a keyboard, etc. In each of the examples of FIG. 2, a user may be able to contact both GUIs 260 and 360 using one or more fingers of a single hand, which, as mentioned, may be for particular input, which may include, for example, gesture input. For example, consider simultaneous input for both GUIs 260 and 360, optionally with a swiping motion up and/or down (top example), pinch and/or expand (middle example), left and/or right (bottom example), etc.

Figure 3:
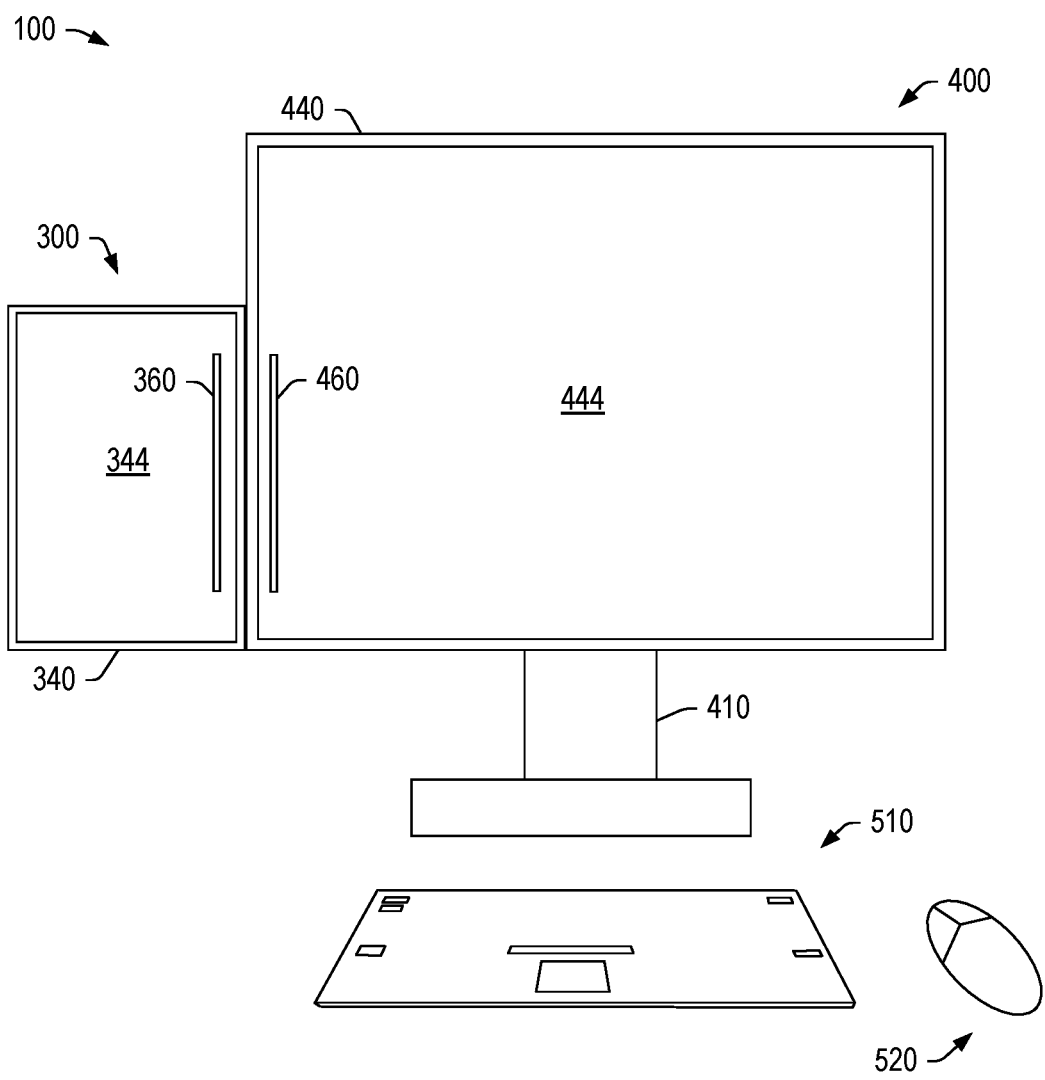
FIG. 3 is a diagram of an example of a system that includes examples of display devices.

FIG. 3 shows an example of the system 100 where the tablet device 300 is coupled to a display device 400 that can be a monitor on a stand 410, where a keyboard 510 and a mouse 520 may also be utilized. As shown, the display device 400 includes a housing 440 supported by the stand 410 where the housing 440 includes a display 444 with a GUI 460 rendered to the display 444. As shown, the tablet device 300 can include the GUI 360 rendered to the display 344 where the GUIs 360 and 460 are rendered adjacent to each other based on edge proximity. In such an example, one or more of the GUIs 360 and 460 may provide options for the keyboard 510 and/or the mouse 520. As mentioned, GUIs may be rendered in a manner where they are physically close to one another such that a hand or other human input device can be used readily for interaction with either of the GUIs. Such an approach can expedite GUI navigation to quickly allow a user to get on with his tasks.

FIG. 4 shows an example of the system 100 as in FIG. 1 and example GUIs 260 and 360. In the example of FIG. 4, the GUIs 260 and 360 can provide control or menu items for display coordination such as extend or mirror (e.g., clone), along with options for synchronization, such as for a keyboard, a mouse, a clipboard, files, applications, wireless circuitry, etc.

FIG. 5 shows an example scenario of the system 100 where a user may utilize the GUI 260 and/or the GUI 360 for input. In such an example, a method can include assigning one of the devices 200 and 300 to be a primary device and/or for its display to be a primary display. For example, consider a scenario where the user has set particular display settings for the device 300 and that those are to be utilized for the device 200. In such an example, the user may utilize the GUI 360 for input such that circuitry causes the display 244 of the device 200 to adapt to the settings of the display 344 of the device 300.

FIG. 6 shows an example of the system 100 where the extend item of the GUI 260 has been selected and, in response, the GUI 360 automatically renders "extended" as a confirmation of the selection being implemented. As shown, the GUIs 260 and 360 may provide for additional options, which may include saving preferences. As shown in FIG. 6, a user may drag a GUI 246 from the display 244 to the display 344, to be rendered as a GUI 346 with the appropriate, desired form, color, etc. In such an example, touch input that involves movement may utilize a form of momentum such that a momentary lack of contact across bezels (e.g., where one or more bezels are present) does not interrupt moving the GUI 246 to the GUI 346.

FIG. 7 shows example scenarios of the system 100 where one or more security measures may be implemented. For example, a security measure can provide a visible and/or non-visible security alerts. In FIG. 7, a visible security alert 370 is rendered, which may be for either or both of the devices 200 and 300. In the examples of FIG. 7, a security alert may include control buttons such as a control button to accept and a control button to decline.

FIG. 8 shows an example scenario of the system 100 where adjustment of sizing and/or color settings may be performed. As shown, the display 244 can include a first set of settings RGB-1 and the display 344 can include a second set of settings RGB-2. Such settings, while including RGB, may be for more than color, such as sizing, aspect ratio, intensity, etc., which may be accessed and/or set using, for example, one or more functions (e.g., API calls, etc.). As an example, where options exist for different refresh rates on at least one display, a refresh rate may be adjusted in an effort to match or closely match refresh rates. In such an approach, where video, gaming, etc., types of content are rendered, such content can appear substantially the same on both displays.

As an example, one or more displays may be set for low blue mode. A user may set such a mode by opening up a start menu, selecting a gear icon to open up a settings menu, entering system settings (e.g., display, notifications, and power), selecting display, and turning on an low blue option (e.g., night light, low blue, etc.). As an example, information as to such an option being enabled may be shared such that both displays utilize that option, where it is available on both displays, or such that both displays do not utilize a low blue mode, where it is not available on at least one of the displays. In a low blue mode, color discrepancies can be very noticeable, for example, a display in a low blue mode compared to one that is not in a low blue mode can appear yellow, which may be distracting and detract from a user's experience.

In some instances, a user may implement a low blue option as some suggest blue light can interfere with sleep (e.g., falling asleep, etc.). For example, a low blue mode can provide for warmer colors at night that may easier on the eye and body. In the WINDOWS system, settings allow for scheduling so-called "night light" (low blue) such that it turns on automatically. For example, select start, then enter settings in the search box: Select Settings>System>Display>Night light. In such an example, if night light toggle is grayed out, the system may have to update the display driver. If available, it is possible to turn on schedule night light and then, either select sunset to sunrise, or select set hours and enter custom times for the night light to turn on and off. As explained, where two display devices are brought into proximity, a method can be implemented in an effort to harmonize colors, which can include harmonizing such that both display devices or neither display device uses of a low blue mode. Further, as an example, where a schedule is utilized, a schedule may be harmonized such that both display devices enter or exit a low blue mode simultaneously. Such an approach can help to maintain harmony between display devices such that one does not switch to low blue mode or away from low blue mode while the other one does not.

As to some examples of API calls/functions, consider one or more of the following:

GetMonitorBrightness( ) - GetMonitorBrightness function
GetMonitorColorTemperature( ) - GetMonitorColorTemperature function
GetMonitorContrast( ) - GetMonitorContrast function
SetMonitorBrightness( ) - SetMonitorBrightness function
SetMonitorColorTemperature( ) - SetMonitorColorTemperature function
SetMonitorContrast( ) - SetMonitorContrast function As an example, an open source approach may be utilized. For example, consider the DisplayCAL framework (formerly known as dispcalGUI), which is a display calibration and profiling solution that utilizes the ArgyllCMS framework, an open source color management system, to take measurements, create calibrations and profiles, and for a variety of other color related tasks. As an example, a camera of one display device may capture an image of another display device with particular content rendered to its display. In such an example, the content may be analyzed to determine one or more settings, which may be utilized for harmonization, etc. For example, consider detection circuitry detecting proximity of a display device with respect to another display device and then controlling rendering of particular content (e.g., a color pattern, etc.) to one of the display devices while a camera of the other one of the display devices is utilized to capture an image of the rendered content for purposes of analysis to determine one or more settings for harmonization of displays of the two display devices. Such an approach may utilize suitable image recognition and image analysis circuitry to facilitate harmonization in a relatively operating system independent manner. As an example, a method can include utilizing an operating system of one display device to harmonize or can include utilizing two operating systems of two display devices to harmonize, where the two operating systems may be of a common family or not. As an example, one or more of the aforementioned frameworks may be utilized, which are available for LINUX, MACOS (IOS) and WINDOWS operating systems.

As an example, a method can include associating a display device with settings and storing the settings to memory along with an identifier for the display device. In such an example, where the display device is brought into proximity of the display device with the stored settings, the stored settings may be accessed and assessed to determine whether they are still valid for harmonizing displays of the two display devices. As an example, the DisplayCAL framework provides for use of a preset, or a calibration (.cal) or ICC profile (.icc/.icm) file from a previous session. As an example, such a file may be utilized optionally with one or more other types of files, information, etc., for harmonizing displays.

As an example, a color space such as a CIE color space may be utilized, which may be utilized in combination with one or more APIs (e.g., consider the COLORINFO structure that defines a device's colors in CIE coordinate space and the CIECHROMA structure in WINDOWS systems as used to describe the chromaticity coordinates, x and y, and the luminance, Y in a CIE color space). The CIECHROMA structure is used by the COLORINFO structure to define colors for GDIINFO. The LDECI4 type is used to represent real numbers to four decimal places. For example, (LDECI4) 10000 represents the real number 1.0000, and (LDECI4)—12345 represents—1.2345. The values of the x and y members of CIECHROMA are to be in the range from 0 through 10000—that is, the values are to represent numbers 0.0000 through 1.0000. The value of the Y member of the structure is to be in the range from 0 through 100. This member can also be 65534 (0xFFFE) under certain circumstances. As an example, a method can include accessing color settings and/or adjusting one or more color settings (e.g., to harmonize color for multiple displays, etc.).

As explained, various types of display related settings can be exposed via various APIs where, for example, detection circuitry can trigger utilization of one or more APIs to retrieve setting information for one or more display devices. As explained, one display device may interrogate another display device as to its settings to provide for harmony in rendering information to two displays of two display devices that are in proximity with one another according to one or more proximity criteria.

In the example of FIG. 8, positional information may be utilized to adjust misalignment and/or m is-rendering such that a more uniform, harmonious visual appearance results. For example, a GUI (e.g., a window) that is split with a portion 265 and a portion 375 may be misaligned and/or mis-sized with or without a match in color settings. In such an example, a method can include accessing various types of information, which can include setting information for virtual display enlargement, virtual display shrinkage, color, intensity, positional alignment, etc., as may be appropriate. As an example, a method can include determining an area of each display (e.g., S-1(x,y) and S-2(x,y)) and finding a common setting such that scale is the same for both displays, as may be adjusted for sake of one display edge being a different size that another display edge. Such an approach can include display cropping, display offsetting horizontally and/or vertically (e.g., in x or y directions). As explained, an approach may be automated and performed upon detection of proximity of one device with respect to another device (or devices).

In the example of FIG. 8, a common resolution may be determined that may be in terms of pixels where the pixels are to be of a common size and where cropping can occur for one or both of the displays 244 and 344. As an example, pixel size may differ and scaling utilized such that a GUI appears to be the same size on both of the displays 244 and 344, while centering occurs such that top and bottom sides of a GUI are aligned. For example, the portion 375 can be scaled down such that the points indicated by open circles are aligned with corresponding points indicated by open circles of the portion 265. In some instances, a portion may be centered with respect to another portion yet smaller or bigger such that scaling occurs while maintaining the two portions with respect to being centered. For example, consider the portion 375 as having x and y dimensions GUI-1b(x,y) as being smaller than the x and y dimensions GUI-1a(x,y) of the portion 265 where the portions 265 and 375 are to be, for example, equal halves. In such an example, the display 344 is to scale up rendering of the portion 375 such that the physical dimensions as appearing on the displays 244 and 344 match (e.g., within some amount of error such as plus or minus 3%).

As an example, a user may utilize touch, a mouse, etc., to move the GUI as represented by the portions 265 and 375 such that it can be on one of the displays 244 and 344. As explained, such a touch may cross bezel regions of two displays where, for example, virtual momentum may be utilized in rendering (e.g., according to a touch movement velocity) such that the effect of the bezel regions on touch is minimal.

As an example, a method can include GUI formatting. For example, a GUI may be formatted in an effort to match how the GUI appears on multiple displays. As an example, one or more of settings and formatting may be utilized to provide a more uniform and harmonious appearance for two or more displays of display devices.

As an example, where movement occurs such as up or down movement with respect to adjacent edges of displays, one or more sensors may detect such movement and positional arrangement of the displays and adjust rendering as to positions of GUIs, content, etc., accordingly. In such an approach, a GUI or other content may appear stationary on a display with respect to another display where movement occurs. For example, consider moving the display 344 up or down with respect to the display 244 while maintaining the position of the portion 375 of the GUI with respect to the portion 265 of the GUI. In such an example, if the edges are no longer adjacent or if the display 344 is moved by too great a distance, the portion 375 of the GUI may disappear. In such an example, a snap function may cause the entire GUI (e.g., both of the portions 265 and 375 to snap onto the display 244 such that the entire GUI is rendered on the display 244 and thereby visible and available for use. As an example, such a snap function may be utilized when the display 244 is moved such that a proximity criterion is no longer met. In such an example, the displays 244 and 344 may return to independent displays with settings are set prior to being brought into proximity with one another (e.g., as may be defined by one or more proximity criteria).

FIG. 9 shows an example of a method that includes a detection block 910 for detecting presence of a first display device adjacent to a second display device, where the first display device includes a first display and the second display device includes a second display; a render block 920 for, responsive to the detecting, automatically rendering a graphical user interface to one or more of the first display and the second display; and a transmit block 930 for, responsive to receipt of input via the graphical user interface, transmitting content from the second display device to the first display device for rendering to the first display according to the input. In such an example, the first display or the second display may be a primary display, while the other is a secondary display.

As an example, a method can include detecting presence of a first display device adjacent to a second display device, where the first display device includes a first display and the second display device comprises a second display; responsive to the detecting, automatically rendering a graphical user interface to one or more of the first display and the second display; and responsive to receipt of input via the graphical user interface, transmitting content from the second display device to the first display device for rendering to the first display according to the input. In such an example, detecting can include receiving display specification information, which may include, for example, rectangular coordinate information. As an example, a method can include scaling content for rendering to a first display to match a physical size of content rendered to a second display. In such an example, the second display can have a larger rectangular area than the first display.

As an example, display specification information can include color information where a method can include adjusting (e.g., harmonizing) at least one color setting of the first display and the second display. In such an example, the at least one color setting can include a color bit depth. As an example, a color model such as RGB, YUV, etc., may be utilized where various settings are specified. As an example, a low blue mode may be enabled by one display where such a mode may aim to reduce eye strain or be a night mode. In such an example, display specification information (e.g., setting information) can be received that indicates whether such a mode is enabled or exists such that a decision can be made as to whether to utilize the mode on adjacent displays or not. As an example, where a low blue mode is scheduled, display specification information may include schedule information such that a schedule can be disabled or harmonized, which may avoid having one display automatically switch color settings responsive to a clock (e.g., a time of day, etc.).

As an example, a graphical user interface can include selectable menu items. For example, selectable menu items can include an extend item for extending a rendering boundary of a first display device to a second display device, a clone item for cloning content of one of the first display and the second display to one of the second display and the first display and/or at least one human input device item. For example, at least one human input device item can include one or more of a keyboard item, a mouse item and a touch input item.

As an example, a graphical user interface can be rendered proximate to a display edge of one or more of a first display and a second display. In such an example, the display edge can be a display edge of the first display or the second display that is physically closest to a display edge of the second display or the first display.

As an example, a method can include rendering a graphical user interface as a first graphical user interface to a first display and rendering another graphical user interface as a second graphical user interface to a second display. In such an example, the first graphical user interface and the second graphical user interface can be rendered at a closest pair of respective edges of the first display and the second display.

As an example, a method can include performing a security process to authorize a level of sharing information between a first display device and a second display device. In such an example, the level of sharing information can limit sharing to transmissible content for rendering and/or the level of sharing information can allow for sharing of at least one file.

As an example, a method can include detecting presence of a display device proximate to another display device by receiving information via ultra-wideband (UWB) circuitry. In such an example, transmitting content from a second display device to a first display device for rendering to a display of the first display device (e.g., according to input via a GUI, etc.) can utilize the ultra-wideband (UWB) circuitry.

As an example, a method can include detecting presence of a display device proximate to another display device by detecting a magnetic field via a magnetic field sensor (e.g., a Hall effect sensor, etc.).

As an example, a method can include transmitting content by utilizing a wireless interface. As an example, transmitting can include casting (e.g., consider MIRACAST technology, etc.). As an example, transmitting can include utilizing at least one dongle. For example, consider a dongle with a connector such as a USB type of connector that can be plugged into a USB type of port of a display device. As an example, a pair of dongles may be utilized where two display devices can interact at least in part via circuitry of the pair of dongles.

As an example, a method can include detecting presence of a display device in proximity to another display device by detecting a relative position of a first display of a first display device with respect to a second display of the second display device. In such an example, the method can include rendering a split window that includes a portion rendered to the first display and a portion rendered to the second display according to the relative position of the first display with respect to the second display. In such an example, the method can include detecting a change in the relative position and, responsive to the change, adjusting the rendering of the portions of the split window. In such an example, the window may be a GUI or another type of window.

As an example, a method can include continuously detecting a relative position of a first display with respect to a second display.

As an example, a method can include, responsive to receipt of input, automatically halting rendering of a graphical user interface to one or more of a first display of a first display device and a second display of a second display device.

As an example, a display device can include a processor; memory accessible to the processor; a display operatively coupled to the processor; and processor-executable instructions stored in the memory, executable by the processor to instruct the display device to: detect presence of another display device; responsive to detection of presence of the other display device, automatically render a graphical user interface to one or more of the display and a display of the other display device; and responsive to receipt of input via the graphical user interface, transmit content to the other display device for rendering to the display of the other display device according to the input.

As an example, one or more computer-readable storage media can include computer-executable instructions stored therein executable to instruct a display device to: detect presence of another display device; responsive to detection of presence of the other display device, automatically render a graphical user interface to one or more of the display and a display of the other display device; and responsive to receipt of input via the graphical user interface, transmit content to the other display device for rendering to the display of the other display device according to the input.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
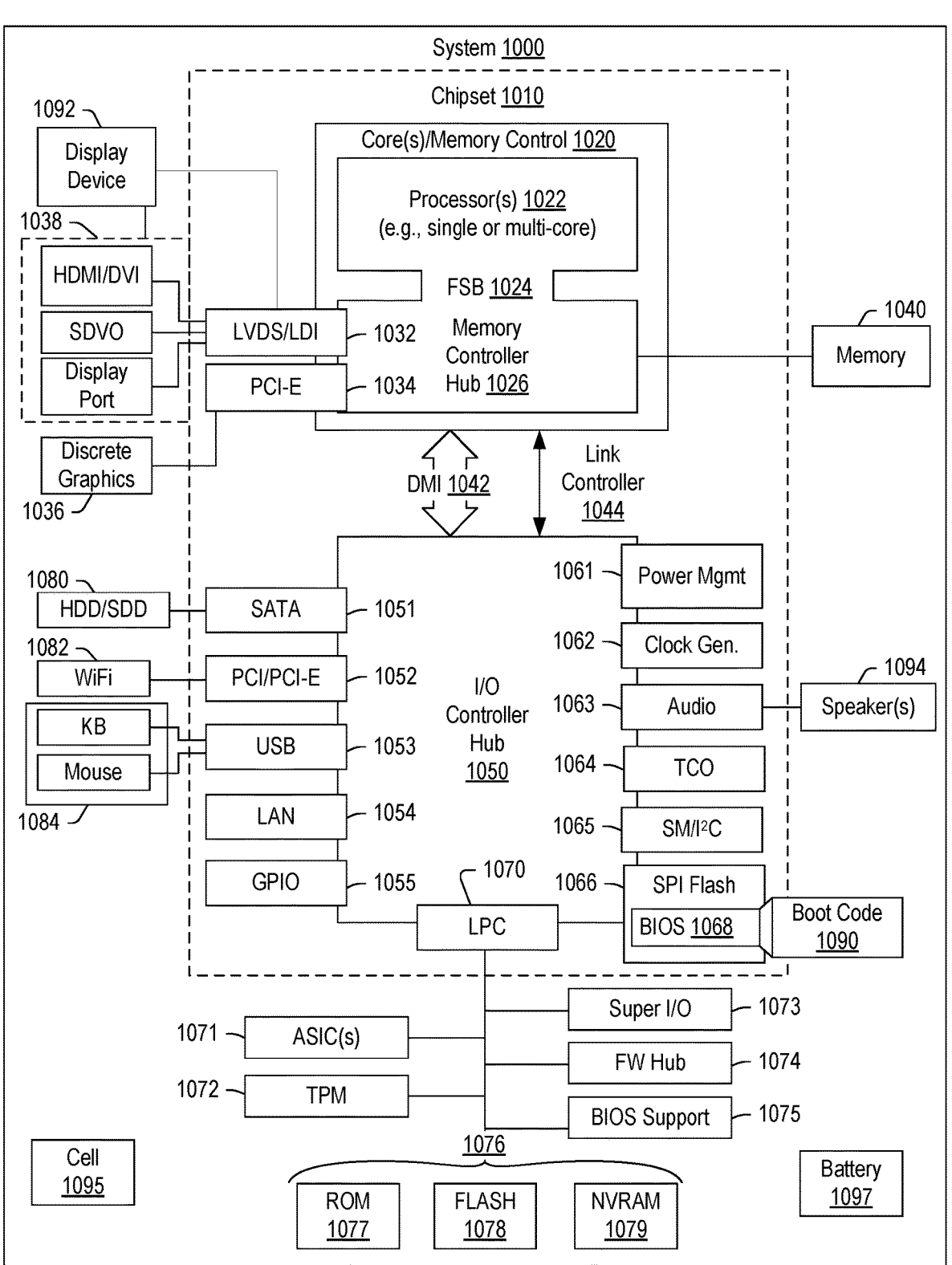
FIG. 10 is a diagram of an example of a system that includes one or more processors.

While various examples of circuits or circuitry have been discussed, FIG. 10 depicts a block diagram of an illustrative computer system 1000. The system 1000 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1000. As an example, a system such as the system 100, the display device 200, the display device 300, the display device 400, etc., may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:

detecting presence of a first display device adjacent to a second display device, wherein the first display device comprises a first display and the second display device comprises a second display;

responsive to the detecting, automatically rendering a graphical user interface to one or more of the first display and the second display, wherein the graphical user interface comprises selectable menu items, wherein the selectable menu items comprise an extend item for extending a rendering boundary of the first display device to the second display device and wherein the selectable menu items comprise a clone item for cloning content of one of the first display and the second display to one of the second display and the first display; and responsive to receipt of input via the graphical user interface, transmitting content from the second display device to the first display device for rendering to the first display according to the input.

2. The method of claim 1, wherein the detecting comprises receiving display specification information.

3. The method of claim 2, comprising scaling the content for rendering to the first display to match a physical size of content rendered to the second display based at least in part on the display specification information.

4. The method of claim 2, wherein the display specification information comprises color information.

5. The method of claim 4, comprising adjusting at least one color setting of the first display and the second display.

6. The method of claim 1, wherein the selectable menu items comprise at least one human input device item, wherein the at least one human input device item comprises one or more of a keyboard item, a mouse item and a touch input item.

7. The method of claim 1, wherein the graphical user interface is rendered proximate to a display edge of one or more of the first display and the second display.

8. The method of claim 7, wherein the display edge is a display edge of the first display or the second display that is physically closest to a display edge of the second display or the first display.

9. The method of claim 1, comprising rendering the graphical user interface as a first graphical user interface to the first display and rendering another graphical user interface as a second graphical user interface to the second display, wherein the first graphical user interface and the second graphical user interface are rendered at a closest pair of respective edges of the first display and the second display.

10. The method of claim 1, comprising performing a security process to authorize a level of sharing information between the first display device and the second display device, wherein the level of sharing information is selected from a group comprising sharing to transmissible content for rendering and sharing of at least one file.

11. The method of claim 1, wherein the detecting presence comprises receiving information via ultra-wideband (UWB) circuitry.

12. The method of claim 1, wherein the detecting presence comprises detecting a magnetic field via a magnetic field sensor.

13. The method of claim 1, wherein the transmitting utilizes a wireless interface.

14. The method of claim 1, wherein the detecting presence comprises detecting a relative position of the first display with respect to the second display.

15. The method of claim 14, comprising rendering a split window that comprises a portion rendered to the first display and a portion rendered to the second display according to the relative position of the first display with respect to the second display and detecting a change in the relative position and, responsive to the change, adjusting the rendering of the portions of the split window.

16. The method of claim 1, comprising, responsive to the receipt of input, automatically halting rendering of the graphical user interface.

17. The method of claim 1, wherein the automatically rendering a graphical user interface renders the graphical user interface to the second display and further comprising automatically rendering a security alert graphical user interface to the first display and, responsive to input received via the security graphical user interface rendered to the first display, enabling the transmitting content from the second display device to the first display device for rendering to the first display according to the input received via the graphical user interface of the second display.

18. A display device comprising:

a processor;

memory accessible to the processor;

a display operatively coupled to the processor; and processor-executable instructions stored in the memory, executable by the processor to instruct the display device to:

detect presence of another display device;

responsive to detection of presence of the other display device, automatically render a graphical user interface to one or more of the display and a display of the other display device, wherein the graphical user interface comprises selectable menu items, wherein the selectable menu items comprise an extend item for extending a rendering boundary of the first display device to the second display device and wherein the selectable menu items comprise a clone item for cloning content of one of the first display and the second display to one of the second display and the first display; and responsive to receipt of input via the graphical user interface, transmit content to the other display device for rendering to the display of the other display device according to the input.

19. One or more computer-readable storage media comprising computer-executable instructions stored therein executable to instruct a display device to:

detect presence of another display device;

responsive to detection of presence of the other display device, automatically render a graphical user interface to one or more of the display and a display of the other display device, wherein the graphical user interface comprises selectable menu items, wherein the selectable menu items comprise an extend item for extending a rendering boundary of the first display device to the second display device and wherein the selectable menu items comprise a clone item for cloning content of one of the first display and the second display to one of the second display and the first display; and responsive to receipt of input via the graphical user interface, transmit content to the other display device for rendering to the display of the other display device according to the input.

* * * * *